March 16, 1971 — C. PAYNE — 3,570,205

PANEL JOINTURE

Filed Nov. 7, 1968 — 2 Sheets-Sheet 1

INVENTOR.
CHARLES PAYNE
BY Oscar B. Brundvak
Attorney

INVENTOR.
CHARLES PAYNE
BY Oscar B Brumback
Attorney

United States Patent Office 3,570,205
Patented Mar. 16, 1971

3,570,205
PANEL JOINTURE
Charles Payne, Coral Gables, Fla., assignor to American Air Filter Company, Inc.
Filed Nov. 7, 1968, Ser. No. 774,016
Int. Cl. E04b 1/40, 1/66
U.S. Cl. 52—466
9 Claims

ABSTRACT OF THE DISCLOSURE

A novel jointure provides a panel seal that is particularly adapted for environmentally controlled enclosures and that is easily mounted and demounted. The novel seal is described as a continuous U-shaped batten with compressible sealant strips disposed on each side between the panel edges. A spline forces the sides of the batten to flex and compresses the sealant against the panel edge to form a vapor-tight barrier.

BACKGROUND OF THE INVENTION

Under many circumstances, the most economical form of construction obtainable from structural sandwich panel components is non-skeletal (viz, without beams, columns, rafters, or any prismatic framing members). Such a non-skeletal construction depends upon plate (or shell) action for structural stability; actually upon the interaction of the several plate surfaces which comprise the top (roof) and sides (walls).

When each plate surface (above-described) of the construction is articulated into panels, these panels must be connected together to form a structurally whole plate surface.

The conventional means of connecting panels together to form a large structural plate surface is by mechanical fasteners (viz, screws, bolts, rivets, etc.). The structural forces existing along the panel joints in the plate are generally of large magnitude, possibly approaching the actual shearing strength through the panel, which necessitates close spacing of fasteners.

Not only is it costly and obtrusive to have many mechanical fasteners on the face of the panel plate, but their presence inhibits ready demountability and reusability of the panels. It has now been found that, by employing a continuous jointure component capable of transferring structural shearing forces between adjacent panels, the need for discreet mechanical fastening (viz, screws, bolts, rivets, etc.) is eliminated.

Because the panels in a panelized structural plate can be conveniently arranged in such a manner as to transfer almost all internal plate forces in shearing between panels (at the jointures), a large non-skeletal shell panelized construction can be formed with virtually no mechanical fasteners (screws, bolts, rivets, etc.).

In accordance with this invention, a continuous structural jointure may be rapidly installed and removed without defacing the panel components, such that the panelized structure may be erected, demounted and reused an indefinitely large number of times without degradation of its principal structural components. Economies are realized by the dual functions of connection and sealing in the single operation of setting the jointure.

Because the jointure is continuous in all joints in the performance of its sealing function, the entire construction is much stiffer and generally stronger than the conventional one that is fastened with discreet mechanical fasteners and sealed by non-structural means.

The invention has proved to be highly desirable in the design of an environmentally controlled enclosure or so-called clean room where panel walls are conventionally used, but they must be tight and should be readily assembled and disassembled. Gas tightness is necessary because purified air is admitted into the room through filters located in the ceiling, is forced to circulate downwardly, and is withdrawn from the room through holes in the floor. In environmentally controlled facilities, it is necessary to have a vapor-tight (leak-proof) enclosure in which to circulate filtered and tempered air—since the penetration of a filtered air stream by contaminated air via leakage will negate the effectiveness of the facility. Normal construction techniques require all joints to be taped, caulked, or otherwise sealed to maintain the integrity of the enclosure.

Panel walls are desirable for the foregoing clean room structures because panel walls are easily assembled, readily demountable and reusable, are commercially available, and are quite common in the construction industry; and they are economical to make and easy to work with. Such pre-fabricated wall panels consist of thin gauge steel, aluminum, or plastic teguments or structural facings having cores of corrugated kraft paper, polystyrene foam, or the like. In some instances, the panels have a hollow core. Panels of this type are arranged in an edge-to-edge relation with a sealing or adjoining means necessary to engage adjacent edges of the abutting panels.

Although panel-type construction is readily available, it has not been used extensively in clean rooms because the provision of a seal between the panels which would permit the panels to be easily assembled and disassembled and yet to provide a vapor-tight seal has been different and expensive. Most factory-fabricated, panelized building constructions employ jointures which can be simply installed and demounted, for example, U.S. Pat. 2,394,443. These prior art jointures, unfortunately, are usually neither water- nor gas-tight. When tighter jointures are employed to prevent water or vapor leakage, the construction becomes so elaborate, expensive, and permanent as to eliminate the practicality of assembling, demounting, and reusing the components. The present invention provides a jointure for adjacent panels which is easily assembled and disassembled and yet provides a water- and gas-tight seal.

SUMMARY OF THE INVENTION

In accordance with the invention, easily assembled and disassembled joined and sealed building panels are provided which are joined together by jointures, coextensive in length with the length of the panels; providing a water- and gas-tight seal. The jointure comprises a continuous U-shaped bifurcated insert or batten with compressible sealant strips longitudinally disposed along the length of the outer sides of the batten (between it and the panel edges), and a spline that is driven into the aperture of the U defined by the sides of an open position which simultaneously compresses the sealant strips disposed thereon, thereby forming a gas-tight seal between the panels.

Two of the above-described joints are usually used to join and seal two adjacent building panels. One joint is located at the upper surface and the second joint is located at the lower surface in the same plane as the first joint. Both joints are normal to the common plane of the two panels.

For reinforcement, the two building joints may be connected by joining the bottoms of the two inserts or battens.

DETAILED DESCRIPTION

Figure 3:
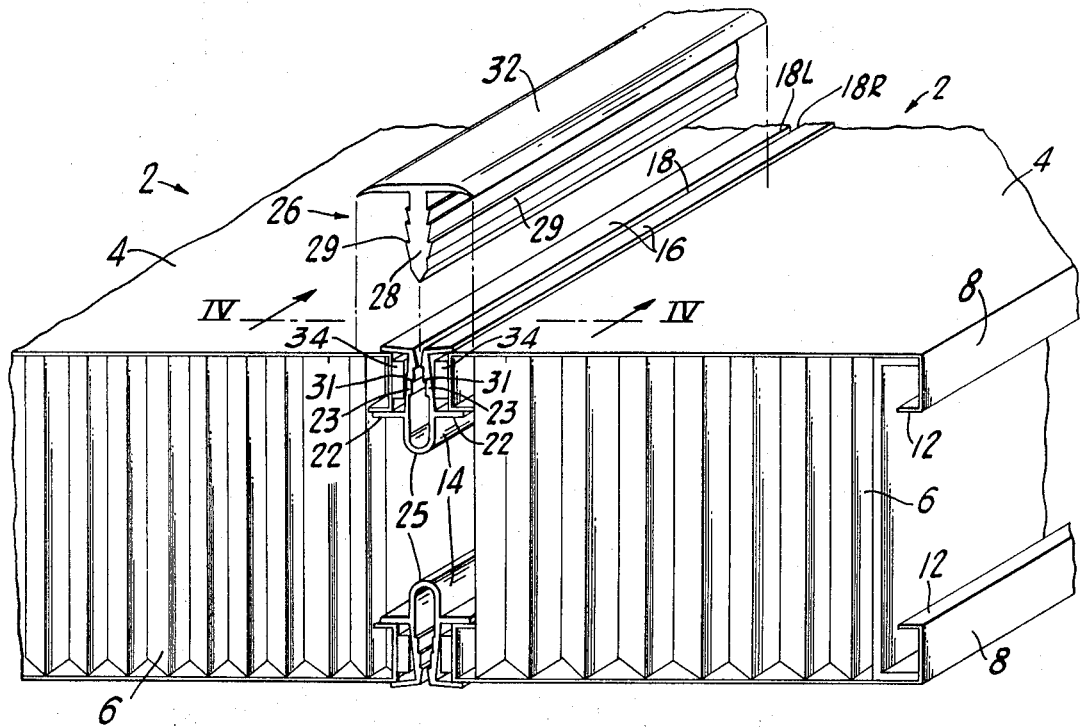
FIG. 3 is a fragmentary perspective view of the panels of FIG. 1 in the process of being sealed.
Figure 1:
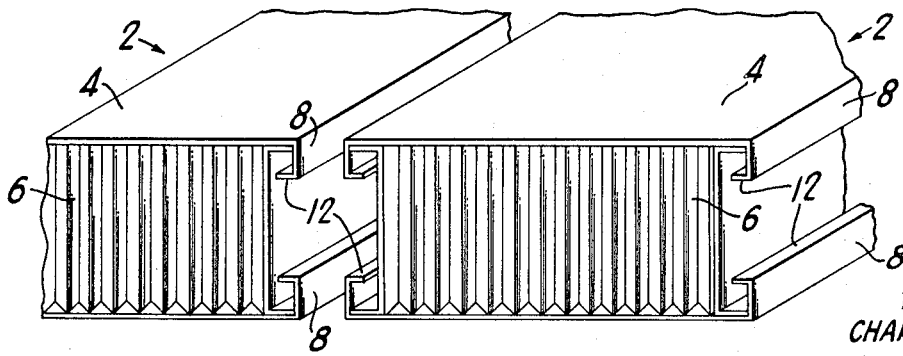
FIG. 1 is a fragmentary perspective view of two adjacent building panels incorporating an embodiment of the invention.

Referring now to FIGS. 1 and 3, the two panels generally denoted 2 that are to be sealed and joined have spaced teguments 4, each of which terminate perpendicularly at 8 at the ends of each panel.

Figure 2:
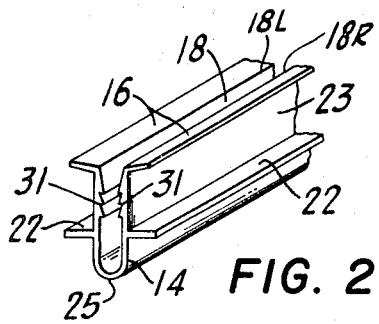
FIG. 2 is a fragmentary perspective view of a batten (with aperture 18 enlarged for purpose of illustration) for use with the panels of FIG. 1.

Referring now to FIGS. 2 and 3, the panels are joined by a generally U-shaped batten 14 comprised of two substantially parallel sides 23 that are joined at the bottom 25. For purposes of illustration, and ease of visualization, the batten 14 has been distorted in FIGS. 2 and 3 in that it is illustrated with the top 18 as being open. Actually, the two edges 18L and 18R will be in engagement prior to the insertion of spline 26 therein and the point of engagement of edges 18L and 18R will present only a hair-like crack appearance. A first pair of arms 16 at the open top 18 of the batten are disposed, one on each of the sides, and extend outwardly generally normal to the sides. A second pair of arms 22 are spaced on the sides a distance below and parallel to the first pair of arms 16.

Referring to FIG. 3, a resilient or plastic strip 34 is positioned between each of the first and said second pairs of arms for engagement with the tegument ends 8 and batten sides 23. A spline 26 is inserted into the open top 18 of the batten to force the sides 23 outwardly to compress the strips 34 against the tegument ends 8 to seal the panel.

Referring to FIG. 1, two adjoining building panels 2 are illustrated herein as being a type that is commercially available. Each panel has opposed skins, teguments, or structural facings 4 and a core section 6. The core section shown in FIG. 1 is of corrugated kraft paper, but it may be hollowed or filled with conventional panel core material such as foamed polystyrene. The structural facings 4 are usually thin gauge material such as metal or wood. The facings 4, as illustrated herein, extend outwardly from the core 6 and are bent at right angles to form a surface 8 and terminate inwardly to form surface 12. It is to be understood, however, that this is so illustrated for purposes of simplicity of description. Were the facings to be of plywood, for example, the solid edge of the plywood facing would serve the function of surface 8 effectively well. The panels are placed in a spaced end-to-end relationship as is illustrated in FIG. 1.

The panels are joined by a batten 14 such as is illustrated in FIG. 2. Batten 14 is a continuous U-shaped insert having at aperture 18 two outwardly extending arms 16. At a point between aperture 18 of the batten and the closed end 25 of the batten are two outwardly extending arms 22 parallel to arms 16. The length of the sides 23 of the U-shaped batten 14 has a width between the two sets of arms 16 and 22 approximately equal to the width of surface 8 on building panel 2. The interior of the sides 23 of the U-shaped batten 14 is grooved.

Sealant material 34 is interposed between surface 8 of the building panel and surface 23 of the batten. The sealant material usually is a flat strip, this type being the easiest to work with but could very well be any shape just as long as the function of sealing is accomplished.

Figure 4:
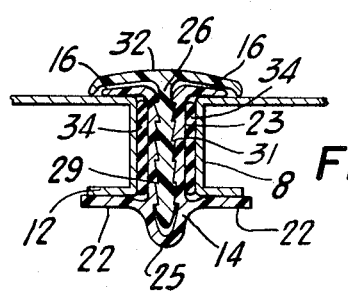
FIG. 4 is a fragmentary cross-sectional view of Section IV—IV as seen in FIG. 3.

A spline 26 is made to be driven into the aperture of the U-shaped batten 14, has a stud member 28 with ribs 29 made to interlock with grooves 31 on the surface 23 of the U-shaped batten 14. The ribs 29 of the stud member 28 are of roughly L-shaped cross-section while the grooves 31 of the batten 14 are of roughly F-shaped cross-section. Thus, when stud member 28 is driven into batten 14, the L-shaped ribs 29 and the F-shaped grooves interlock preventing the spline from recoiling from the batten. In cross-section, as seen in FIG. 4, these interlocking rib and groove formations appear in the form of saw-tooth lines. The spline 26 is driven into the aperture 18 of the U-shaped batten causing the sides 23 to flex compressing the sealant 34 between surface 8 of the building panel and arms 16 and 22 of the batten 14. The spline also has a cap portion 32 which aids in inserting the spline and in removal to be described later.

The materials used for the construction of the invention are of a wide variety. For example, the continuous U-shaped batten and spline can be of metal or plastic and of various thicknesses depending upon the application. For economical reasons, it is found to be most feasible to select materials of construction which are readily extrudable such as aluminum or plastic. Of particular advantage, polyvinylchloride is easily extrudable in the desired shapes and still gives an effective jointure. The batten and the spline may be colored by simply adding the desired pigment to the extrusion machine. The sealant material may be any of the well-known caulking-type materials, but butyl rubber tape has been found to be easily applied and yet still is an effective seal.

Assembly of two adjoining panels is quite easy with the following four steps:

(1) Two panels are brought together in an adjoining relationship as is shown in FIG. 1.

(2) The continuous U-shaped batten 14 with an uncompressed sealant strip 34 disposed along each side is placed between the two adjacent panels so that arms 16 are against side 4 and arms 22 are against side 12. Note: The uncompressed sealant material 34 may be placed along the side 23 of batten 14 or against the panel edge 8.

(3) Spline 26 is driven into the hair-line crack formed by the engagement of edges 18L and 18R thereby opening the aperture 18 causing the sides 23 to flex compressing the sealant 34 between surface 8 of the building panel and arms 16 and 22 of the batten 14. Note, also, that, besides serving as sealing boundaries, arms 16, prevent inward lateral movement of the U-shaped batten 14 on the insertion of the spline 26. Arms 22 prevent an outward recoil of the U-shaped batten 14 after the spline has been inserted.

The insertion of the spline 26 forms a continuous connection between panels for shearing forces which act between panels along the direction of the jointure. The shear force is transferred from panel edge to U-shaped assembly of batten 14 and spline 26 by virtue of the adhesive strength and shear strength of the compressed sealant 34. The batten assembly is strong in longitudinal shear strength and transfers the joint force readily from one side to the other; and, hence, to the adjacent panel edge through its abutting compressed sealant. Thus, all of the panels employed to make up a whole structural plate surface are shear connected together with this jointure.

The disassembly is also quite easily done. When it is desired to dismount the panel construction, one merely inserts a lever (not shown) between the cap portion 32 of the spline 26 and arms 16 of the batten 14 and pries the entire spline 26 out of the aperture 18. For facility and removal, stud member 28 may be smooth on one side having ribs on one side only.

It will be obvious to one skilled in the art that the features contemplated in this invention are illustrated as being embodied in a building, specifically in a clean room, only for purposes of illustration. The invention in a simple and efficient manner provides the main function of shear connection within an articulated diaphragm and is directly applicable to any structural shell design or building system conception. It is to be realized further that the units above-specified, may be assembled to create partitions, floors, ceilings, and the like.

Figure 5:
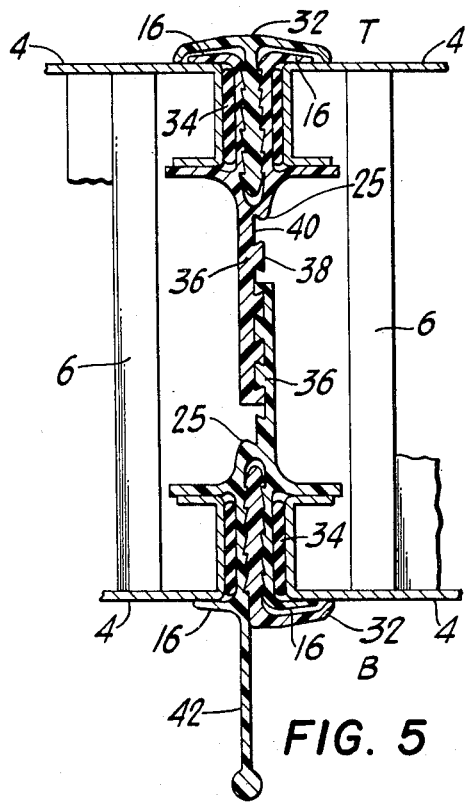
FIG. 5 is a fragmentary cross-sectional view of another embodiment of the invention.

An alternate embodiment of the invention is shown in FIG. 5. Here, two building panels 2 are joined at both the top and bottom skins, designated in the figure as T and B to form a sealing. The seal and the method of sealing is as that described for FIGS. 1 through 4, with the exception that, in FIG. 5, two sealing means are shown (T and B) joined together by interlocking trailing members 36 which extend outwardly from the bottom 25 of the U-shaped battens 14. The interlocking mechanism is shown as a dovetail jointure with tongues or tenons 38 dovetailed into corresponding sockets 40. The trailing members 36 are shown as having a plurality of tongues or sockets. Thus, the interlocking is adjustable with panels of varying widths being able to be joined or sealed at both the top and bottom teguments. The hanger is shown as being an extension of the outwardly extending arms 16 of the continuous U-shaped batten 14. Note that the cap 32 of the spline has been changed to accommodate the downwardly extending hanger 42 by having the cap portion 32 with only 1 outwardly extending and downwardly terminating flange.

If a load is put on hanger 42, the force of the load will be transferred to the hanger through the lower joint sealing unit B and partially transferred through the interlocking trailing members 36 to the top joint sealing unit T. Therefore, the purpose of the trailing members 36 is to act as a load transfer device, removing part of the force from the lower joint sealing unit or from the lower seal which has been brought about by a load placed on hanger member 42 through the top seal.

Figure 6:
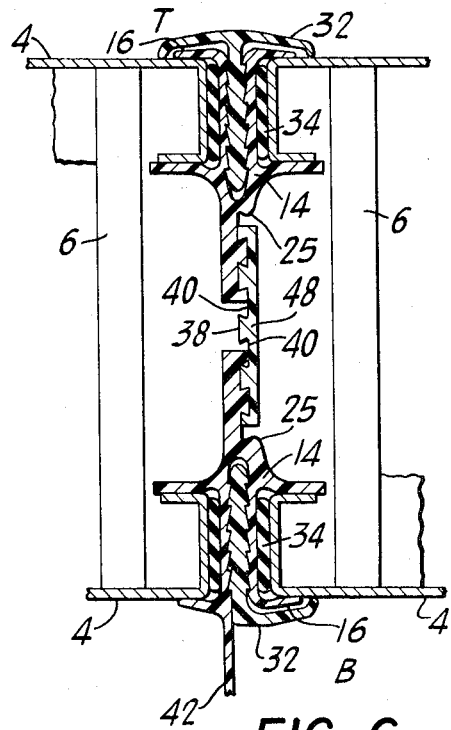
FIG. 6 is a fragmentary cross-sectional view of still another embodiment of the invention.

Another embodiment of the invention is shown in FIG. 6. The seal and the method of sealing is described for FIG. 5 with the exception that the trailing members 36 are joined together by a third bridging member 48. The interlocking mechanism is as that described for FIG. 5 with tongues or tenons 38 being dovetailed into corresponding sockets 40. This embodiment of the invention has the advantage as that described in FIG. 5 in that the interlocking mechanism is adjustable with panels of varying widths being able to be joined or sealed at both the top and bottom teguments. The adjustable feature, of course, comes about from the pluralities of tenons 38 and sockets 40 on the trailing members 36 and the bridging member 48.

Figure 7:
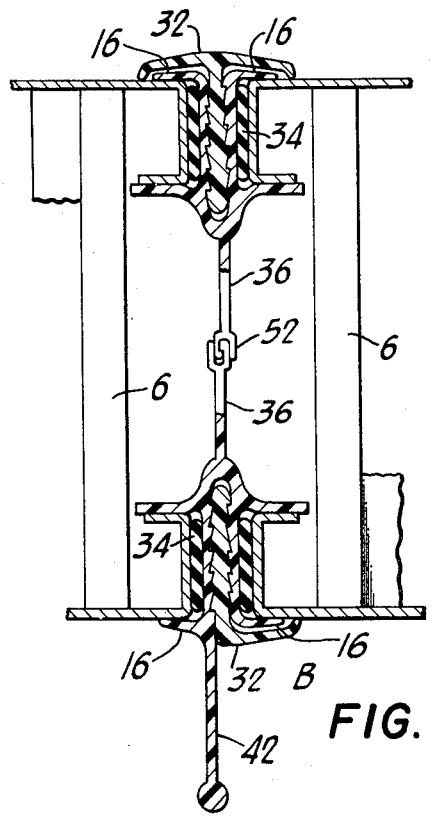
FIG. 7 is a fragmentary cross-sectional view of a further embodiment of the invention.

Still another embodiment of the invention is shown in FIG. 7. The seals and the method of sealing is as that described for FIG. 6 with the exception that the trailing members 36 are interlocked by a knuckle locking type of mechanism 52 instead of the tenons and socket type of locking mechanism as described for FIG. 6. This embodiment does not have the advantage of the embodiment of FIGS. 5 and 6 in being able to join and seal panels of varying widths.

Figure 8:
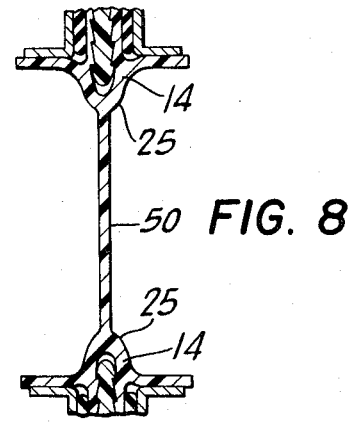
FIG. 8 is a fragmentary cross-sectional view of a still further embodiment of the invention.

It should be made clear here that the type of interlocking mechanism of the trailing members should not be limited to the types shown in the various drawings, but any type of additional holding type of mechanism would suffice. The only requirement for the trailing members is that they effectively transfer part of the load from the bottom seal to the top seal. In conjunction with this, it would be readily apparent that a solid connecting member 50 as shown in FIG. 8 would suffice for this purpose.

What is claimed is:

1. A joined and sealed system capable of transferring structural shearing forces comprising:
   (a) adjacent panels that have spaced structural facings, each of which terminates perpendicularly, inwardly at the ends of each panel to provide facing tegument ends;
   (b) a generally U-shaped batten with two substantially parallel sides that are joined at the bottom;
   (c) a first pair of arms at the top of said batten disposed one on each of said sides and extending outwardly generally normal to said sides;
   (d) a second pair of arms on said sides spaced a sufficient distance below and parallel to and coextensive with said first pair of arms to engage said tegument ends therebetween;
   (e) a sealing strip positioned between each of said first and said second pairs of arms for engagement with said facing tegument ends and said batten sides; and
   (f) a spline for insertion into the top of said batten, said spline being sized to be coextensive with said sealing strip to force said sides outwardly to compress said strip against said facing ends to seal said panels, press said strip against said facing ends to seal said panels.

2. The jointure as described in claim 1 wherein said spline has ribs extending the length of said spline on at least one side thereof.

3. The jointure as described in claim 2 wherein said U-shaped batten has grooves extending along the length of the interior portion of said parallel sides, made to interlock with said ribs.

4. The jointure as described in claim 1 wherein said spline has at the top outwardly extending and downwardly terminating flanges.

5. A joined and sealed system comprising:
   (a) a first and second building panel, positioned in substantially the same plane;
   (b) said panels having a core and first and second skins on opposed sides of said core;
   (c) said first and second skins of said building panels each extending beyond said core and being bent at right angles toward the center of said core and terminating in another right angle bend inwardly to form facing tegument ends:
   (d) a U-shaped batten extending coextensive in length with the length of said building panels having parallel sides that are joined at the bottom;
   (e) said parallel sides having grooves extending along the length of the interior of said sides;
   (f) the batten having a first pair of arms coextensive in length with the length of the batten, located at the top of said batten, and disposed one on each of said sides, each of said pair of arms extending outwardly generally normal to said sides; and a second pair of arms coextensive in length with the length of the batten, located intermediate said bottom and said top of said batten, and disposed one on each of said sides of said batten, extending outwardly generally normal to said sides, said first and second pair of arms being spaced a sufficient distance to engage said tegument ends therebetween;
   (g) a resilient strip positioned between said first and said second pair of arms for engagement with said tegument ends of said adjacently placed panels;
   (h) a spline coextensive in length with the length of said batten for insertion into the top of said batten to force said sides outwardly to compress said sealant against said tegument ends;
   (i) said spline having ribs running the length of at least one side of the spline for engagement with the grooves of at least one of said batten sides.

6. A joined and sealed system as described in claim 5 which is joined and sealed at both said first and said second skins, said battens lying in substantially the same plane and generally normal to said first and second skins.

7. A pair of adjacently joined and sealed units as described in claim 6 wherein at least one of said battens has a projection extending from said top to serve as a load-bearing hanger; said battens are interconnected.

8. A pair of adjacently joined and sealed units as described in claim 7 in which the interconnection is formed by two projections, extending one from each of said bottoms of said battens, engaging and frictionally locking with one another at a point intermediate the two battens.

9. A pair of adjacently joined and sealed units as described in claim 7 in which said battens are interconnected by two projections, extending one from each of said bottoms of said battens, being coextensive in length with the length of said battens, and a bridge which engages and frictionally locks said two projections.

References Cited

UNITED STATES PATENTS

| | | | |
|---|---|---|---|
| 1,893,480 | 1/1933 | Mitchell | 52—466 |
| 2,394,443 | 2/1946 | Guignon | 52—584X |
| 3,066,451 | 12/1962 | Petty | 52—468 |
| 3,203,147 | 8/1965 | Penley | 52—468X |
| 3,246,437 | 4/1966 | Toney | 52—586X |
| 3,303,626 | 2/1967 | Brigham | 52—586 |
| 3,353,318 | 11/1967 | Bacher | 52—403 |
| 3,417,529 | 12/1968 | Archinal et al. | 52—468 |

PRICE C. FAW, Jr., Primary Examiner

U.S. Cl. X.R.

52—403, 584